United States Patent
Bleisch

(10) Patent No.: US 9,997,056 B2
(45) Date of Patent: Jun. 12, 2018

(54) SECURITY PANEL COMMUNICATION SYSTEM

(71) Applicant: ADT US HOLDINGS, INC., Boca Raton, FL (US)

(72) Inventor: N. David Bleisch, Boca Raton, FL (US)

(73) Assignee: ADT US Holdings, Inc., Boca Raton, FL (US)

( * ) Notice: Subject to any disclaimer, the term of this patent is extended or adjusted under 35 U.S.C. 154(b) by 390 days.

(21) Appl. No.: 14/103,107

(22) Filed: Dec. 11, 2013

(65) Prior Publication Data
US 2014/0159895 A1 Jun. 12, 2014

Related U.S. Application Data

(60) Provisional application No. 61/735,828, filed on Dec. 11, 2012.

(51) Int. Cl.
G08B 25/00 (2006.01)
G08B 25/10 (2006.01)
H04M 11/04 (2006.01)
H04L 12/28 (2006.01)
G08B 29/16 (2006.01)
G08B 29/08 (2006.01)
G08B 27/00 (2006.01)

(52) U.S. Cl.
CPC ........... G08B 25/10 (2013.01); G08B 25/004 (2013.01); H04M 11/04 (2013.01); G08B 25/001 (2013.01); G08B 27/00 (2013.01); G08B 29/08 (2013.01); G08B 29/16 (2013.01); H04L 12/2825 (2013.01)

(58) Field of Classification Search
CPC .................................................... G08B 25/004
USPC ............................................................ 340/507
See application file for complete search history.

(56) References Cited

U.S. PATENT DOCUMENTS 7,542,721 B1 * 6/2009 Bonner ................ G08B 25/004
340/539.1
2003/0156028 A1 8/2003 Menard et al.
(Continued)

FOREIGN PATENT DOCUMENTS

WO 94/24805 A1 10/1994

OTHER PUBLICATIONS

International Search Report and Written Opinion dated Apr. 3, 2014 for International Application Serial No. PCT/US2013/074456, International Filing Date: Dec. 11, 2013, consisting of 10 pages.

*Primary Examiner* — Benyam Haile
(74) *Attorney, Agent, or Firm* — Christopher & Weisberg, P.A.

(57) ABSTRACT

The invention relates to a wireless communication device for a security system that may include a device communicator configured for wireless communication with a security panel and for providing an additional wireless communication path to a monitoring center; and a premises power supply for removably connecting the device to a power source at the premises. The device may also include an alternate power supply, and an input device for enabling a user to initiate communications. The device may also be programmed so that the device can delay the transmission of an event signal for a predetermined period of time and then initiate transmission of the event signal if it does not receive a signal from the security panel to cancel transmission of the event signal during the predetermined period of time.

19 Claims, 2 Drawing Sheets

(56) References Cited

U.S. PATENT DOCUMENTS

| | | | |
|---|---|---|---|
| 2006/0176167 A1* | 8/2006 | Dohrmann | G08B 25/001 340/506 |
| 2008/0204219 A1* | 8/2008 | Cohn | G08B 25/08 340/506 |
| 2009/0274104 A1 | 11/2009 | Addy | |
| 2010/0277300 A1* | 11/2010 | Cohn | G08B 29/02 340/506 |
| 2010/0281312 A1* | 11/2010 | Cohn | G08B 25/001 714/49 |
| 2013/0082836 A1 | 4/2013 | Watts | |
| 2015/0120015 A1* | 4/2015 | Fadell | G08B 19/005 700/90 |

\* cited by examiner

SECURITY PANEL COMMUNICATION SYSTEM

CROSS-REFERENCE TO RELATED APPLICATION

This application is related to and claims priority to U.S. Provisional Patent Application Ser. No. 61/735,828, filed Dec. 11, 2012, entitled "SECURITY PANEL COMMUNICATION SYSTEM", the entirety of which is incorporated herein by reference.

FIELD OF INVENTION

The invention relates to a communication device for premise security systems, particularly to alarm systems that use all-in-one or self-contained wireless alarm panels, and more particularly to a system for modifying the communication system used with such panels.

BACKGROUND

It is common for businesses and homeowners to have a security system for detecting alarm conditions (such as intrusion, fire, carbon monoxide, flooding, etc.) at their premises and reporting these to a monitoring station and/or a server or other system that instead notifies the user for self-monitoring through their phone, PDA, etc., or for remotely interacting with and controlling lifestyle systems (such as lighting, thermostats, energy management devices, etc.). Typically, these security panels communicate with a monitoring station or other remote location over a conventional phone line, DSL or cable, or a radio that communicates with a cellular or other wireless network. The radios may operate as either a primary or a back-up communication. Radios used for security systems can be found, for example, in U.S. Pat. No. 7,542,721 and International PCT Application No. WO2011CA00487.

In order to simplify and reduce the time of installation of such systems, some manufacturers have introduced All-in-One ("AIO") panels that combine a keypad, alarm panel and siren, or some combination thereof, into self-contained units that communicate wirelessly with sensors and other devices. In order to communicate with a monitoring station or other remote location, the AIO panels must also be wired to the phone line/cable, or a communication radio. In order to further simplify the installation process, some manufacturers are introducing AIO panels with built-in radio modules.

Radio communicators are subject to obolesce as cellular carriers (such as AT&T, Verizon, Sprint, etc.) move to next generation technologies and optimize their networks in a manner that no longer support earlier technologies. For example, in 2008 the FCC permitted cellular network carriers to sunset their support of analog cellular technologies on their networks in favor of supporting only digital devices. This was not an issue for most users of the cellular network who update their smart phones and other mobile devices frequently and who had virtually all replaced their analog cell phones with digital cell phones long before the sunset date.

But for security monitoring customers with analog radios installed in their premises, the radios had to be replaced or they would no longer be able to communicate with monitoring centers. The industry estimates that more than 400,000 analog radios had to be replaced by trained technicians who had to schedule appointments and roll trucks to the premises in order to perform the replacements. Because the installed base of current digital radios for security monitoring is even higher and continues to grow, and will grow at a much faster pace as radios are incorporated into AIO panels, the cost and logistical infeasibility of replacing all of those radios when they become obsolete would be staggering.

It would therefore be desirable to have an additional wireless communication device that could be sent to a customer, which would allow the customer to upgrade the communication capability of the security panel by self-enrolling the device with the existing premises security panel as a replacement for the obsolete radio, without the need to have their equipment modified or replaced by a service technician.

SUMMARY OF THE INVENTION

The invention relates to a wireless communication device for a security system that may include a device communicator configured for wireless communication with a security panel and for providing an additional wireless communication path to a monitoring center; and a premises power supply for removably connecting the device to a power source at the premises. The device may also include an alternate power supply, and an input device for enabling a user to initiate communications. The device may also be programmed so that the device can delay the transmission of an event signal for a predetermined period of time and then initiate transmission of the event signal if it does not receive a signal from the security panel to cancel transmission of the event signal during the predetermined period of time.

According to one embodiment, a self-enrollable communication device for establishing communications between a security panel located at a premises and a monitoring center remote from the premises is provided. The security panel includes a local communicator for communicating wirelessly at the premises and a radio communicator for communicating with the monitoring center. The communication device includes a device communicator configured to automatically establish wireless communication with the local communicator of the security panel and remote communication with the monitoring center upon occurrence of a predetermined event. The communication device includes a premises power supply for removable connection to a power source at the premises to provide power to the device communicator.

In accordance with another aspect to this embodiment, the predetermined event is receipt of power from the premises power supply. The communication device includes an input device in which the actuation of the input device is the predetermined event. The input device is selected from the group consisting of a push button switch, a keypad, and a capacitive sensor. The device communicator is further configured to communicate with the local communicator of the security panel via a communication technology selected from the group consisting of Ethernet, Z-wave, Zigbee, and Bluetooth. The device communicator is further configured to communicate with the monitoring center via a communication technology selected from the group consisting of 2G, 3G, 4G, and Long Term Evolution, LTE. The device communicator is further configured to communicate with the monitoring center via a local area network connection. The communication device includes an alternate power supply for providing power to the device communicator if power from the premises power supply is disrupted.

In accordance with another embodiment, a communication device for establishing communications between a security panel located at a premises and a monitoring center remote from the premises is provided. The security panel includes a local communicator for communicating wirelessly at the premises and a radio communicator for communicating with the monitoring center. The communication device includes a device communicator configured for wireless communication with the local communicator of the security panel and for communication with the monitoring center, and so that when the device communicator receives an event signal from the security panel, the device communicator delays the transmission of the event signal for a predetermined period of time, and then initiates transmission of the event signal to the monitoring center if the device communicator does not receive a signal from the security panel to cancel transmission of the event signal during the predetermine period of time. The communication device includes a premises power supply for removable connection to a power source at the premises to provide power to the device communicator.

In accordance with another aspect of this embodiment, the device communicator is further configured to communicate with the local communicator of the security panel via a communication technology selected from the group consisting of Ethernet, Z-wave, Zigbee, and Bluetooth. The device communicator is further configured to communicate with the monitoring center via a communication technology selected from the group consisting of 2G, 3G, 4G and Long Term Evolution, LTE. The device communicator is further configured to communicate with the monitoring center via a local area network connection. The communication device includes an alternate power supply for providing power to the device communicator if power from the premises power supply is disrupted. The communication device is self-enrollable, and the device communicator is further configured to automatically establish wireless communication with the local communicator of the security panel and remote communication with the monitoring center upon occurrence of a predetermined event. The predetermined event is receipt of power from the premises power supply. The communication device further includes an input device, and the actuation of the input device being the predetermined event. The input device is selected from a group consisting of a push button switch, a keypad, and a capacitive sensor.

In accordance with another embodiment, a communication device for establishing communications between a security panel located at a premises and a monitoring center remote from the premises is provided. The security panel includes a local communicator for communicating wirelessly at the premises and a radio communicator for communicating with the monitoring center. The communication device includes a device communicator configured for wireless communication with the local communicator of the security panel and for communication with the monitoring center. The communication device includes an input device for actuating the device communicator to automatically establish the wireless communication with the local communicator of the security panel and remote communication with the monitoring center. The communication device includes a premises power supply for removable connection to a power source at the premises to provide power to the device communicator. When the device communicator receives an event signal from the security panel, the device communicator delays the transmission of the event signal for a predetermined period of time, and then initiates transmission of the event signal to the monitoring center if the device communicator does not receive a signal from the security panel to cancel transmission of the event signal during the predetermine period of time.

In accordance with another aspect of this embodiment, the input device is selected from the group consisting of a push button switch, a keypad, and a capacitive sensor.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

For simplicity and ease of explanation, the invention will be described herein in connection with various embodiments thereof. Those skilled in the art will recognize, however, that the features and advantages of the invention may be implemented in a variety of configurations. It is to be understood, therefore, that the embodiments described herein are presented by way of illustration, not of limitation.

Figure 1:
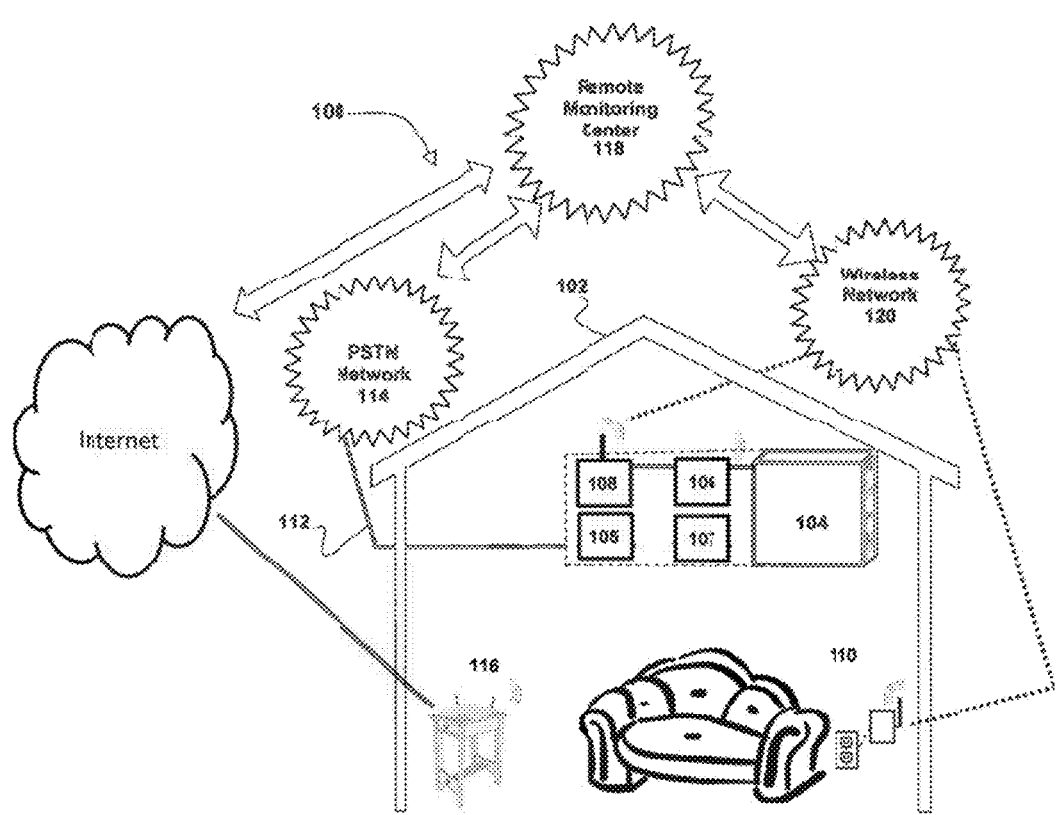
FIG. 1 is a drawing of a system employing the invention.
Figure 2:
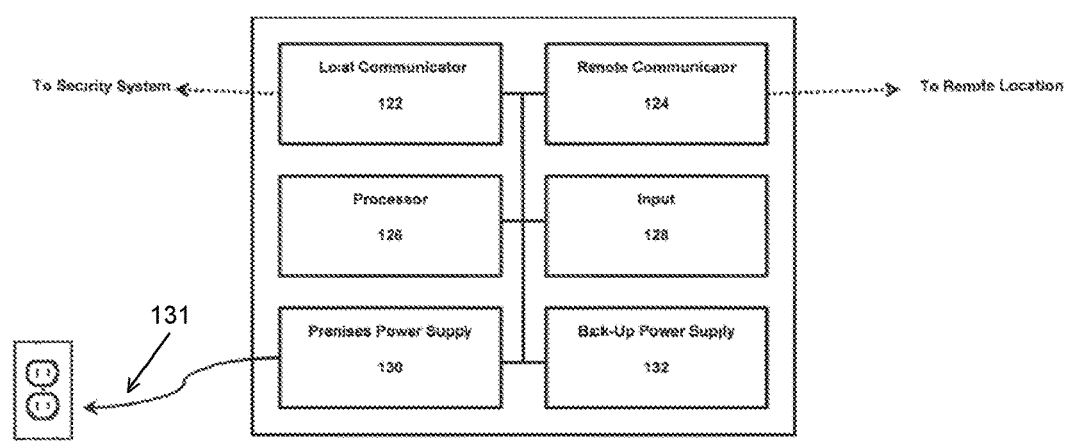
FIG. 2 is a drawing of components of a device of the invention.

FIGS. 1 and 2 will be used to illustrate various aspects of the invention. Shown in FIG. 1 are a system 100 that includes a premises 102 (such as a home or other residence) to be secured using security panel 104 and one or more sensors 105. Sensors 105 are used to detect the occurrence of some alarm event and may communicate with security panel 104 either via a wired connection or wirelessly. For example, a contact sensor on a door or window would detect the (unauthorized) opening of the door or window, a smoke detector would detect the presence of smoke; a motion detector would sense movement, etc. Various types of such sensors are well known to those of ordinary skill in the art and will not be further elaborated upon here.

When sensor 105 detects an event (smoke, window opening, etc.), it sends a signal to security panel 104. Upon receiving a signal from sensor 105, processing technology within security panel 104 would interpret the signal, and if appropriate, generate an event signal to be sent to remote monitoring center 118. Security panel 104 may communicate with remote monitoring center 118 in a number of ways. Security panel 104 could communicate over a conventional twisted pair telephone line via public switched telephone network (PSTN) 114. Security panel 104 could also communicate over wireless network 120. This may be in lieu of PSTN 114, as a backup to PSTN 114, or the primary means of communication with PSTN 114 being a backup.

As shown in FIG. 1, security panel 104 may include radio communicator 108 for communication with remote monitoring center 118 over wireless network 120. Wireless network 120 may comprise, for example, a carrier operated cellular network, two-way radio network, or the like. Radio communicator 108 may comprise, for example, a cellular radio that employs cellular communication capability commonly known to those of skill in the art (e.g., 2G, 3G, GSM, etc.), two-way radio, and the like. Radio communicator may be physically separate from security panel 104, or integral therewith (such as with many AIO panels).

If security panel 104 is an AIO panel, it may also include an integrated keypad 105 for programming and controlling security panel 104, as well as an integrated notification appliance 107 (such as a horn, strobe, etc.). In an AIO panel, local wireless module 106 and remote wireless communicator 108 may also be integral with security panel 104.

In addition to enabling communication between security panel 104 and radio communicator 108, security panel 104 may include wireless module 106 also enables security panel 104 to communicate locally with additional wireless device 110, either directly or indirectly (for example, via a local wireless router 116).

Further illustration of an embodiment of additional wireless device 110 is shown in FIG. 2. As shown, additional wireless device 110 may include a communicator having a local communication module 122, remote communication module 124, and processor 126. Additional wireless device 110 may further include, input 128, premises power supply 130, and back-up power supply 132. Local communication module 122 may include appropriate processing chips/circuitry, and an antenna to enable additional wireless device 110 wirelessly receive the event signal from (and transmit other signals to) security panel 104—either directly from local wireless module 106 or indirectly through a wireless router 116. This may be accomplished using any number of wireless network technologies, such as Ethernet, Z-wave, Zigbee, Bluetooth, and the like.

Remote communication module 124 similarly may enable additional wireless device 110 to communicate with remote monitoring center 118 via wireless network 120. This may be accomplished using any number of cellular technologies (such as 2G, 3G, 4G, LTE, etc.), two-way radio, and the like. Alternatively, Remote communication module 124 may connect to remote monitoring center 118 by connecting to a local area network (such as via wireless router 116, or a wired connection) that is connected to the Internet. Such technologies are well known to those of skill in the art and will not be further elaborated upon here.

The components of additional wireless device 110 may be powered via premises power supply 130 or back-up power supply 132. Premises power supply 130 may comprise, for example, removable connector 131, such as power cord for plugging into a standard electrical outlet, and a transformer (not shown) for drawing and utilizing household current to power the device; alternatively the transformer can be embedded in the device with prongs on the device that can be plugged directly into a standard electrical outlet. Back-up power supply 132 may comprise, for example, a battery, or other replaceable/rechargeable source of power that can be contained in the device.

Processor 126 contains programming to control the reception and transmission of signals by additional wireless device 110, and allows additional wireless device 110 to initially engage in communication with security panel 104. This may be accomplished automatically, for example by sensing an initial powering of the additional wireless device 110 (either by premises power supply 130 or by back-up power supply 132).

Alternatively, additional wireless device 110 may also include an input 128 to allow a user, for example, to reset the device, or trigger the device to communicate with security panel 104. Input 128 may comprise a push button switch, a keypad, a capacitive sensor, or other input devices known to those of skill in the art.

In the event that there is a change in wireless network 120, such as a change in communication protocols (such as 2G to 3G, etc.), that necessitates a change to wireless communicator 108, then system 100 can be easily upgraded by simply adding (or replacing) additional wireless device 110 to the system. This has the advantage that it can be done easily by a user of the system, without the need to incur the cost of sending trained service technicians to the premises to otherwise replace or upgrade the system.

In accordance with embodiments of the present invention, a wireless communication device can be sent to a customer, which allows the customer to upgrade the communication capability of the security panel by self-enrolling the device with the existing premises security panel as a replacement for the obsolete radio, without the need to have their equipment modified or replaced by a service technician.

Similarly, such a device could be used as additional protection against situations known as 'smash and crash.' Most alarm panels have built-in delays (CP-01 or other) between the time a sensor is activated and the time an alarm is transmitted to a monitoring center to allow the home owner time to disarm the system. Thus, most security panels are potentially susceptible to being disabled or destroyed by an intruder upon entering the home before they send an alarm signal to the monitoring center, if the intruder can get to the panel and fully disable it during the delay period.

This susceptibility may be greater in an AIO panel because the AIO panel with its built-in keypad is usually mounted in a visible location close to the primary point of ingress and may chirp when a sensor is activated (as opposed to a traditional alarm panel that is usually mounted in an out-of-site location like a basement or closet and will therefore transmit an alarm signal even if the perpetrator destroys the keypad near the point of ingress).

The additional wireless communication device of the present invention can help mitigate this risk by receiving an alarm signal sent by the AIO panel without delay when a sensor has been activated, waiting for a delay period, and then sending an alarm signal to the monitoring center unless it receives a second signal from the AIO panel indicating that the alarm event has been cancelled (such as by the user entering their passcode on the keypad on the AIO panel).

If the AIO panel is destroyed during the delay period, the device can still send the alarm signal to the monitoring center at the end of the delay period. Because the device can be plugged into any outlet in the premises (it can be placed behind furniture, in a closet, etc.) and will not make a noise when activated, it is less likely to be located and potentially destroyed during the delay period.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A self-enrollable communication device for establishing communications between a security panel located at a premises and a monitoring center remote from the premises, the security panel including a local communicator for communicating wirelessly with wireless devices at the premises and a radio communicator for communicating with the monitoring center, the local communicator not being preconfigured to communicate with the monitoring center, the communication device comprising:

a device communicator configured to self-enroll by automatically establishing wireless communication with the local communicator of the security panel and wireless remote communication with the monitoring center upon occurrence of a predetermined event, the wireless remote communication established by the device communicator replacing wireless remote communication established by the security panel for transmitting at least one alert to the monitoring center; and
a premises power supply for removable connection to a power source at the premises to provide power to the device communicator.

2. The communication device of claim 1, wherein the predetermined event is receipt of power from the premises power supply.

3. The communication device of claim 1, further comprising an input device, the actuation of the input device being the predetermined event.

4. The communication device of claim 3, wherein the input device is selected from the group consisting of a push button switch, a keypad, and a capacitive sensor.

5. The communication device of claim 1, wherein the device communicator is further configured to communicate with the local communicator of the security panel via a communication technology selected from the group consisting of Ethernet, Z-wave, Zigbee, and Bluetooth.

6. The communication device of claim 1, wherein the device communicator is further configured to communicate with the monitoring center via a communication technology selected from the group consisting of 2G, 3G, 4G, and Long Term Evolution, LTE.

7. The communication device of claim 1, wherein the device communicator is further configured to communicate with the monitoring center via a local area network connection.

8. The communication device of claim 1, further comprising an alternate power supply for providing power to the device communicator if power from the premises power supply is disrupted.

9. The communication device of claim 1, wherein the device communicator is further configured so that when the device communicator receives an event signal from the security panel, the device communicator delays the transmission of the event signal for a predetermined period of time, and then initiates transmission of the event signal to the monitoring center if the device communicator does not receive a signal from the security panel to cancel transmission of the event signal during the predetermined period of time.

10. A communication device for establishing communications between a security panel located at a premises and a monitoring center remote from the premises, the security panel including a local communicator for communicating wirelessly with wireless devices at the premises and a radio communicator for communicating with the monitoring center, the local communicator not being preconfigured to communicate with the monitoring center, the communication device comprising:
a device communicator configured to self-enroll by automatically establishing wireless communication with the local communicator of the security panel and wireless communication with the monitoring center upon occurrence of a predetermined event, and so that when the device communicator receives an event signal from the security panel, the device communicator delays the transmission of the event signal for a predetermined period of time, and then initiates wireless transmission of the event signal to the monitoring center if the device communicator does not receive a signal from the security panel to cancel transmission of the event signal during the predetermined period of time, the wireless communication established by the device communicator with the monitoring center replacing wireless communication established by the security panel with the monitoring center; and
a premises power supply for removable connection to a power source at the premises to provide power to the device communicator.

11. The communication device of claim 10, wherein the device communicator is further configured to communicate with the local communicator of the security panel via a communication technology selected from the group consisting of Ethernet, Z-wave, Zigbee, and Bluetooth.

12. The communication device of claim 10, wherein the device communicator is further configured to communicate with the monitoring center via a communication technology selected from the group consisting of 2G, 3G, 4G and Long Term Evolution, LTE.

13. The communication device of claim 10, wherein the device communicator is further configured to communicate with the monitoring center via a local area network connection.

14. The communication device of claim 10, further comprising an alternate power supply for providing power to the device communicator if power from the premises power supply is disrupted.

15. The communication device of claim 10, wherein the predetermined event is receipt of power from the premises power supply.

16. The communication device of claim 10, further comprising an input device; and
the actuation of the input device being the predetermined event.

17. The communication device of claim 16, wherein the input device is selected from a group consisting of a push button switch, a keypad, and a capacitive sensor.

18. A communication device for establishing communications between a security panel located at a premises and a monitoring center remote from the premises, the security panel including a local communicator for communicating wirelessly with wireless devices at the premises and a radio communicator for communicating with the monitoring center, the local communicator not being preconfigured to communicate with the monitoring center, the communication device comprising:
a device communicator configured to self-enroll by automatically establishing wireless communication with the local communicator of the security panel and for wireless communication with the monitoring center upon occurrence of a predetermined event, the wireless communication established by the device communicator with the monitoring center replacing wireless communication established by the security panel with the monitoring center;
an input device for actuating the device communicator to automatically establish the wireless communication with the local communicator of the security panel and wireless remote communication with the monitoring center;
a premises power supply for removable connection to a power source at the premises to provide power to the device communicator; and
when the device communicator receives an event signal from the security panel, the device communicator delays the transmission of the event signal for a predetermined period of time, and then initiates transmission of the event signal to the monitoring center if the device communicator does not receive a signal from the security panel to cancel transmission of the event signal during the predetermined period of time.

19. The communication device of claim 18, wherein the input device is selected from the group consisting of a push button switch, a keypad, and a capacitive sensor.

\* \* \* \* \*